United States Patent
Hellgren et al.

(10) Patent No.: US 12,123,724 B2
(45) Date of Patent: Oct. 22, 2024

(54) METHOD FOR OPERATING A VEHICLE

(71) Applicant: Volvo Truck Corporation, Gothenburg (SE)

(72) Inventors: Jonas Hellgren, Gothenburg (SE); Leo Laine, Härryda (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 344 days.

(21) Appl. No.: 17/281,352

(22) PCT Filed: Oct. 2, 2018

(86) PCT No.: PCT/EP2018/076858
§ 371 (c)(1),
(2) Date: Mar. 30, 2021

(87) PCT Pub. No.: WO2020/069730
PCT Pub. Date: Apr. 9, 2020

(65) Prior Publication Data
US 2022/0042808 A1    Feb. 10, 2022

(51) Int. Cl.
*G01C 21/34* (2006.01)
*B60W 40/105* (2012.01)
*G06N 20/00* (2019.01)

(52) U.S. Cl.
CPC ....... *G01C 21/3407* (2013.01); *B60W 40/105* (2013.01); *G01C 21/3469* (2013.01); *G01C 21/3492* (2013.01); *G06N 20/00* (2019.01); *B60W 2520/10* (2013.01); *B60W 2556/50* (2020.02); *B60W 2720/103* (2013.01)

(58) Field of Classification Search
CPC ........... G01C 21/3407; G01C 21/3469; G01C 21/3492; G01C 21/3453; B60W 40/105; B60W 2520/10; B60W 2556/50; B60W 2720/103; G06N 20/00
See application file for complete search history.

(56) References Cited

U.S. PATENT DOCUMENTS

| 2008/0195269 A1 | 8/2008 | Lacy et al. | |
| 2013/0297207 A1* | 11/2013 | Mason | G01C 21/34 701/400 |
| 2014/0277835 A1* | 9/2014 | Filev | G06F 17/00 701/2 |
| 2014/0297182 A1 | 10/2014 | Casson et al. | |

(Continued)

FOREIGN PATENT DOCUMENTS

| EP | 2533013 A1 | 12/2012 |
| WO | 2015/147723 A1 | 10/2015 |

OTHER PUBLICATIONS

International Preliminary Report on Patentability for PCT/EP2018/076858, mailed Apr. 13, 2021, 21 pages.

(Continued)

*Primary Examiner* — Maceeh Anwari
(74) *Attorney, Agent, or Firm* — Withrow & Terranova, PLLC (57) ABSTRACT

The present disclosure generally relates to a computer implemented method for operating a vehicle (104, 106, 108), specifically in relation to efficient transporting of a predefined cargo. The present disclosure also relates to a corresponding arrangement and computer program product.

11 Claims, 4 Drawing Sheets

(56) References Cited

U.S. PATENT DOCUMENTS

| | | | | |
|---|---|---|---|---|
| 2014/0350820 | A1* | 11/2014 | Johansson | B60K 31/00 |
| | | | | 701/93 |
| 2016/0258770 | A1* | 9/2016 | Mason | G06Q 10/06311 |
| 2017/0262804 | A1* | 9/2017 | Shroff | G06N 7/01 |
| 2017/0300049 | A1* | 10/2017 | Seally | G08G 1/202 |
| 2017/0351255 | A1* | 12/2017 | Anderson | G05D 1/0297 |
| 2018/0107216 | A1* | 4/2018 | Beaurepaire | G06Q 30/0261 |
| 2018/0158020 | A1* | 6/2018 | Khasis | G01C 21/343 |
| 2019/0346275 | A1* | 11/2019 | Kelly | G01C 21/3415 |
| 2020/0064140 | A1* | 2/2020 | Tarkiainen | G08G 1/096811 |

OTHER PUBLICATIONS

International Search Report and Written Opinion for PCT/EP2018/076858, mailed Jun. 25, 2019, 12 pages.

* cited by examiner

METHOD FOR OPERATING A VEHICLE

This application is a 35 USC 371 national phase filing of International Application No. PCT/EP2018/076858, filed Oct. 2, 2018, the disclosure of which is incorporated herein by reference in its entirety.

TECHNICAL FIELD

The present disclosure generally relates to a computer implemented method for operating a vehicle, specifically in relation to efficient transporting of a predefined cargo. The present disclosure also relates to a corresponding arrangement and computer program product.

BACKGROUND

The shipment of cargo/goods/freight is an age-old method of transporting items from one location to another. Logistics is difficult to define because it is both evolving and ubiquitous. It has evolved from a relatively straightforward concept of materials handling to a more expansive concept of a collection of services that facilitate the economic transactions associated with production and trade. As such, logistics encompasses not only the physical movement of cargo, but also includes coordination among participants and control of the cost for transporting the cargo. Today, cargo is shipped using a particular method (e.g., air, ground, rail, ocean, etc.) based on a desired and/or requested delivery date. For example, local domestic packages are shipped via ground using e.g. a truck.

To ensure that the goods is delivered to the right location at the right time it is necessary to make use of high level strategic planning, generally including some form of route planning for the vehicle (such as the mentioned truck) involved. EP2533013 presents an example of a route planning methodology, taking into account regulations relating to e.g. speed limitations and the working environment for the truck driver.

According to EP2533013, it may for example be possible to ensure that the route planning can be adapted to ensure that e.g. regulatory breaks are coordinated with e.g. refueling of the truck, thereby reducing the overall time spent for transporting the cargo from its pickup point to the delivery location.

Even though the solution proposed in EP2533013 provides improvements as to the regulatory operation of the vehicle, it would be desirable to allow for further enhancements in relation to route planning, such as for example taking into account the cost aspects of the transportation, still ensuring that the cargo is delivered on time. As such, there appears to be room for further improvements, where also the mentioned optimization focus is taken into account.

SUMMARY

In accordance with an aspect of the present disclosure, the above is at least partly alleviated by means of a computer implemented method for operating a vehicle, comprising the steps of receiving an indication of a route for transporting a predefined cargo, the indication of the route comprising a start and a destination, receiving an indication of a required time of arrival at the destination, determining a speed profile for travelling the route, determining a relaxation coefficient for the speed profile, wherein the relaxation coefficient is dependent on a combination of a delay risk for the route and a penalty for arrival at the destination after the required time of arrival, and controlling the vehicle based on a combination of the speed profile and the relaxation coefficient.

The present disclosure is based on the understanding that transport buyers are interested in getting their cargo transported at the lowest possible cost, still with some constraints on for example cargo arrival time. As a consequence, a major challenge for transport providers is to coordinate and control its fleet of vehicles, such as trucks, cars, etc., in such a way that the assignments are executed in a cost efficient manner. Cargo arriving "on time" should, within the concept of the present disclosure, be understood to mean arrival at the desired time, meaning that the cargo should be neither "too late" nor "too early".

Accordingly, the required time of arrival at the destination may in some embodiments include a time of arrival range. It may similarly be possible, and within the scope of the present disclosure to allow the route to comprise a predetermined time range for arriving at the start of the route. That is, it may in some embodiments be desirable to ensure that the vehicle does not arrive at the pick-up location too early or too late.

In line with the present disclosure, this is achieved by the introduction of a relaxation coefficient that essentially sets "how strict" the operational control of the vehicle must be, where the relaxation coefficient is formed by balancing the delay risk (typically time based) for the route and the penalty for arrival at the destination after the required time of arrival. Accordingly, in case the delay risk as well as the cost for arriving late is in comparison high, then the vehicle must be controlled in a much stricter manner to follow the speed profile as compared to a situation where the delay risk has been determined to be low and also the cost for arriving late is low.

Accordingly, advantages following the present disclosure for example include the possibility to allow different missions for transporting cargo to have differently determined relaxation coefficients and thus to control the vehicles performing the transporting missions differently. This may accordingly result in different "costs" for the different transport missions. Generally, the stricter the speed profile must be followed the higher the cost for operating the vehicle.

Within the context of the present disclosure it should be understood that the expression "cost" should be interpreted broadly. That is, cost must not at all be monetary, but should rather be seen as to include other aspects involved with vehicle operation, such as for example environmental impact (e.g. $CO_2$), operational wear of components comprised with the vehicle or related to the vehicle, etc. However, energy consumption (including at least one of fuel or electrical energy consumption) is of course highly relevant for the present disclosure.

In accordance to the present disclosure the delay risk for the route may be determined based on historical data for the route. For example, the vehicle may by itself collect data during transportation missions (e.g. using one or a plurality of sensors or measurements means) and make use of this data in determining future delay risks for a previously traveled route or road segment. However, in some embodiments a (e.g. large) fleet of vehicles may collaborate for populating e.g. a database with data collected during a large plurality of transportation missions (travelling e.g. the same or different routes comprising road segments). It may alternative or also be possible to form a simulation of the route to be travelled and to include a delay risk determination with such a simulation. Such a simulation may partly be based on historical data.

In a preferred embodiment of the present disclosure it may be possible to allow a machine learning scheme to be applied to the historical or simulated data for determining the relaxation coefficient. That is, a model may be trained on the previously collected data or the simulated data. Such a model may for example include at least one of an unsupervised machine learning process or a supervised machine learning process.

As discussed above it is desirable to ensure that the vehicle is operated according to relevant regulations, both relating to the general vehicle operation and as well as how a driver is to operate the vehicle. Thus, it is preferred to allow the speed profile to be determined based on at least one of a desired maximum speed for the vehicle or a maximum legal speed for the vehicle at a section of the route. Accordingly, the general speed profile will set the maximum (and possible minimum) speed range for how the vehicle is operated, and the relaxation coefficient is used for controlling how strict this speed profile is followed, without "pushing though" e.g. a speed limit for a specific portion/segment of the route. It should be understood that the speed profile in some embodiments at least partly may be optimized for reduced transport energy consumption The method according to the present disclosure may in some embodiments be performed on-board the vehicle, e.g. using an electronic control unit (ECU) comprised with the vehicle. Accordingly, the vehicle may itself determine the relaxation coefficient "on the fly", e.g. for each individual transportation mission. However, at least one portion of the method may in some alternative embodiments be performed using a remote server such as a cloud server, where the cloud server being network connected to an electronic control unit (ECU) comprised with the vehicle. That is, in such embodiment e.g. a fleet management function may be used for coordinating how the vehicles are operated.

According to another aspect of the present disclosure, there is provided an arrangement for controlling a vehicle, the arrangement comprising computing circuitry, wherein the computing circuitry is adapted to receive an indication of a route for transporting a predefined cargo, the indication of the route comprising a start and a destination, receive an indication of a required time of arrival at the destination, determine a speed profile for travelling the route, determine a relaxation coefficient for the speed profile, wherein the relaxation coefficient is dependent on a combination of a delay risk for the route and a penalty for arrival at the destination after the required time of arrival, and control the vehicle based on a combination of the speed profile and the relaxation coefficient. This aspect of the present disclosure provides similar advantages as discussed above in relation to the previous aspect of the present disclosure.

The disclosed arrangement is preferably comprised as a component of a vehicle, where the vehicle for example may be at least one of a truck and a working machine.

According to a still further aspect of the present disclosure, there is provided a computer program product comprising a non-transitory computer readable medium having stored thereon computer program means for operating a vehicle, wherein the computer program product comprises code for receiving an indication of a route for transporting a predefined cargo, the indication of the route comprising a start and a destination, code for receiving an indication of a required time of arrival at the destination,—code for determining a speed profile for travelling the route, code for determining a relaxation coefficient for the speed profile, wherein the relaxation coefficient is dependent on a combination of a delay risk for the route and a penalty for arrival at the destination after the required time of arrival, and code for controlling the vehicle based on a combination of the speed profile and the relaxation coefficient. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1:
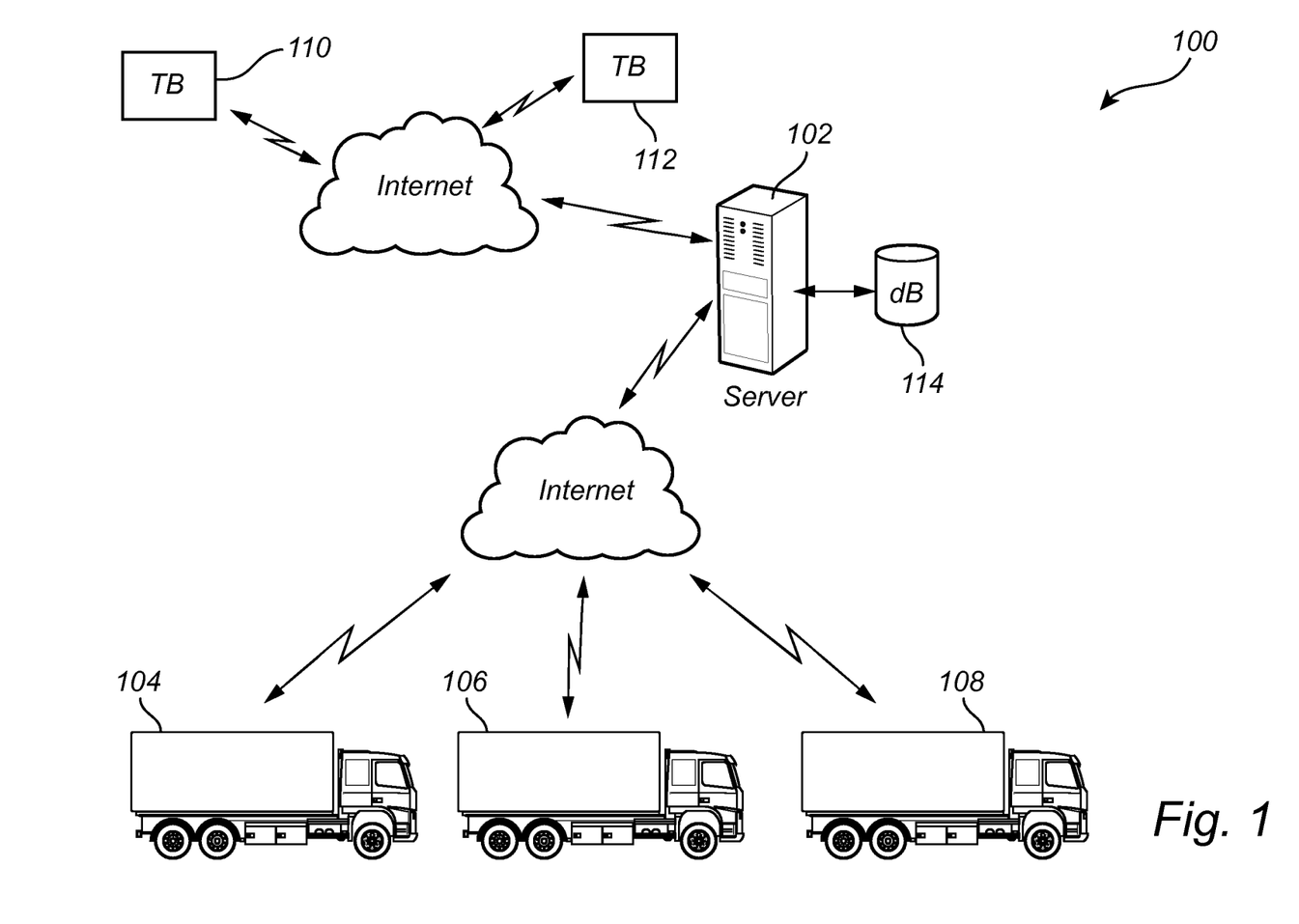
FIG. 1 conceptually illustrates a fleet management system, where the concept according to the present disclosure may be applied.

Referring now to the drawings and to FIG. 1, there is conceptually depicted a fleet management system 100, where the concept according to the present disclosure may be applied as an arrangement/component. The fleet management system 100 comprises a centrally arranged server 102 adapted to control the operation of a plurality of vehicles 104, 106, 108. The illustration as shown in FIG. 1 presents only three vehicles, however fewer or a greater number of vehicles are possible and within the scope of the present disclosure. FIG. 1 further illustrates trucks; however it could be possible to also include other forms of vehicles, such as smaller cargo vehicles, cars, etc.

The centrally arranged server 102 may in some embodiment be seen as a central "control hub", providing an entity such as a transport provider with means for communicating instructions to the vehicles 104, 106, 108 for transporting a predefined cargo from a pic-up location (start) to a destination, possibly travelling along a route that has been determined by the server 102 to a drop-off location (end). The server 102 may for example be provided with a network connection, such as the Internet, for facilitating the communication with the vehicles 104, 106, 108.

The server 102 may also be arranged in communication with one or a plurality of transport buyers 110, 112. FIG. 1 shows only two transport buyers 110, 112, however fewer or a greater number of transport buyers are possible and within the scope of the present disclosure. Also the of transport buyers 110, 112 may be connected to the server 102 using e.g. the Internet.

During general operation of the fleet management system 100, the transport buyer 110, 112 presents a request to the server 102 in regards to a transport assignment, where the request may for example comprise an indication that a predefined cargo is to be transported from a pick-up location (defining a start of a route) to a delivery location (similarly defining an end of the route), where the goods is to be delivered at a specific delivery time (or no later than a predefined time). The request may also comprise a desire to receive an estimated overall cost (e.g. monetary, environmental, etc.) for transporting the goods.

Generally, the server 102 may determine if it is possible for one of the vehicles 104, 106, 108 to perform the transport assignment. If at least one of the vehicles 104, 106, 108 indicates that this is possible, then the server 102 may perform a calculation for determining the estimated cost for the transport assignment and provide such feedback to the transport buyer 110, 112. The estimated cost for the transport assignment may for example be determined by taking into account the distance to be travelled (from start to end of the route), the fuel and operational cost for the distance to be travelled, personnel cost (driver, loading/unloading personnel, etc.), the predefined cargo (such as e.g. weight, type of cargo, etc.), the time of the day to perform the transportation assignment, the urgency to perform the transportation assignment, etc.

The server 102 may in line with the present disclosure also determine a speed profile for travelling the route, where the speed profile is formulated to ensure that operation of the vehicle 104, 106, 108 fulfills current regulations (e.g. maximum speed for different road segments) as well as is to arrive at the specific delivery time. The speed profile is typically adapted for different segments of the route to be travelled, i.e. where the speed is set slower (such as when traveling within a city environment, etc.) for some segments as compared to other (such as when traveling at a highway, etc.).

In line with the present disclosure, it may be possible to allow the planning of the transportation assignment, and as a consequence the determination of the estimated cost, to be dependent on the above mentioned relaxation coefficient. Specifically, the server 102 may request the transport buyer 110, 112 to additionally present an indication of a penalty for arrival at the destination after the required time (and/or time period) of arrival (including not arriving before a specified time).

The indication of the penalty for arrival at the destination after the required time of arrival may then be correlated with an e.g. predetermined delay risk for the route. That is, the server 102 may, based on a determined route for transporting the predefined cargo from the start to the end, determine how much time delay that could be expected for performing the transport assignment to ensure that the cargo arrives as requested by the transport buyer 110, 112.

In accordance to the present disclosure it may for example be possible to base the determination of the delay risk (for example defined as a span of minutes or hours for the route) on previously collected data for the specific route to be travelled for performing the transport assignment. The delay risk may also or alternatively be based on combining previously collected data for a plurality of separate or overlapping segments relating to the route. That is, delay risks for different segments of the road may be combined for determining the "overall" delay risk for the road.

It may also be possible to include a machine learning process for enhancing the determination of the delay risk. For example, the historically collected data relating to the route (or segments of the route), e.g. stored in database 114, may be processed by the server 102, using the machine learning process, to estimate the delay risk. Feedback from a performed transport mission may then be used for adapting the machine learning process such that future delay risk determinations are becoming more correct as compared to the actual case when performing the transport assignment.

Preferably, the overall cost determination that is provided to the transport buyer 110, 112 may be performed by the server 102 using a machine learning process. Specifically, the database 114 may be arranged to store the actual costs of performed transport assignments (as well as what type of cargo that was transported, the route, the actual delay, etc.), where this information then may be used by the machine learning process for determining future cost estimations.

Figure 2A:
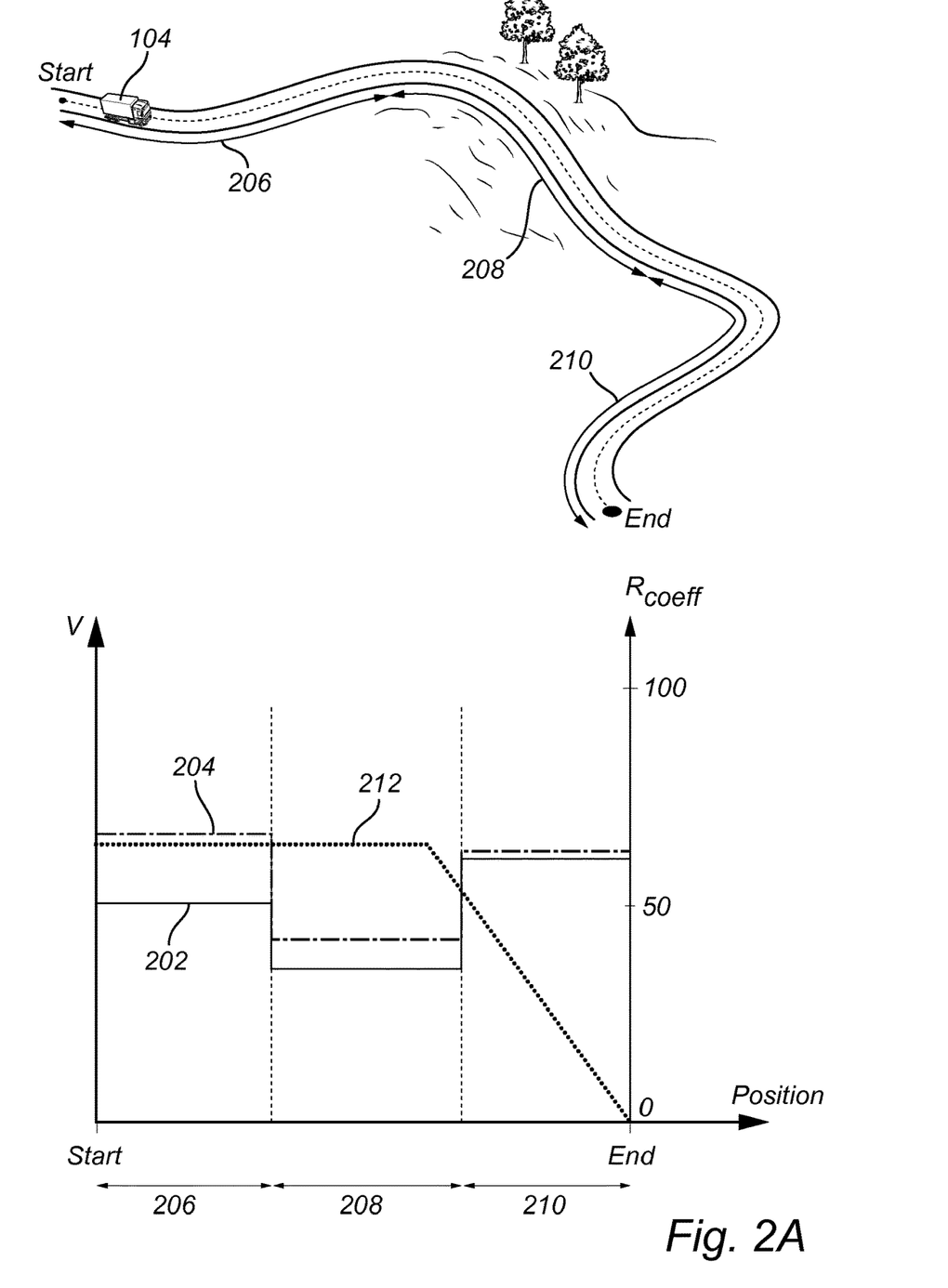
FIG. 2 provides an illustrative example of an arrangement for controlling a vehicle in line with the present disclosure.

FIG. 2A provides an example of a speed profile 202 that may be determined by the server 102. The speed profile 202 may for example be formulated for ensuring that the vehicle 104, 106, 108 is arriving at the destination at the specific delivery time, in some embodiments optimized for minimizing the wear of the vehicle 104, 106, 108, for minimizing the fuel consumption, or for minimizing the environmental impact of performing the transport mission.

FIG. 2A further shows a maximum speed limit 204 for the route, form the start to the end of the route. Additionally, in FIG. 2A the route is illustrated to comprise three separate segments 206, 208, 210. The route may of course comprise more than or fewer than three segments.

Still further, FIG. 2A illustrates the concept with the relaxation coefficient. That is, the determined relaxation coefficient, shown with line 212, exemplifies how is may be possible to implement a form of flexibility in regards to the transport assignment. As shown, the relaxation coefficient defines how strict the vehicle 104, 106, 108 must follow the determined speed profile 202. If for example it is determined that the risk of delay is high, then the speed profile 202 must be followed in a stricter manner as compared to a situation where the delay risk is lower. Additionally, if the transport buyer 110, 112 as indicated that there is an in comparison large penalty for arrival at the destination after the required time of arrival it is desirable to follow the speed profile 202 in a stricter manner as compared to the situation where the penalty for arrival at the destination after the required time of arrival is in comparison low. As is seen in FIG. 2A, the relaxation coefficient must not necessary be linear for the complete route, meaning that the relaxation coefficient may be "stricter" for some segments of the route as compared to other.

In the illustration shown in FIG. 2A the relaxation coefficient is exemplified as a value between 0-100, where a larger relaxation coefficient is an indication that the speed profile 202 may be followed in a less strict manner as compared to a situation where the relaxation coefficient is small. In some embodiments it may be a possibility to allow the relaxation coefficient to be larger at the start of the transport assignment as compared to at the end of the transport assignment.

Figure 2B:
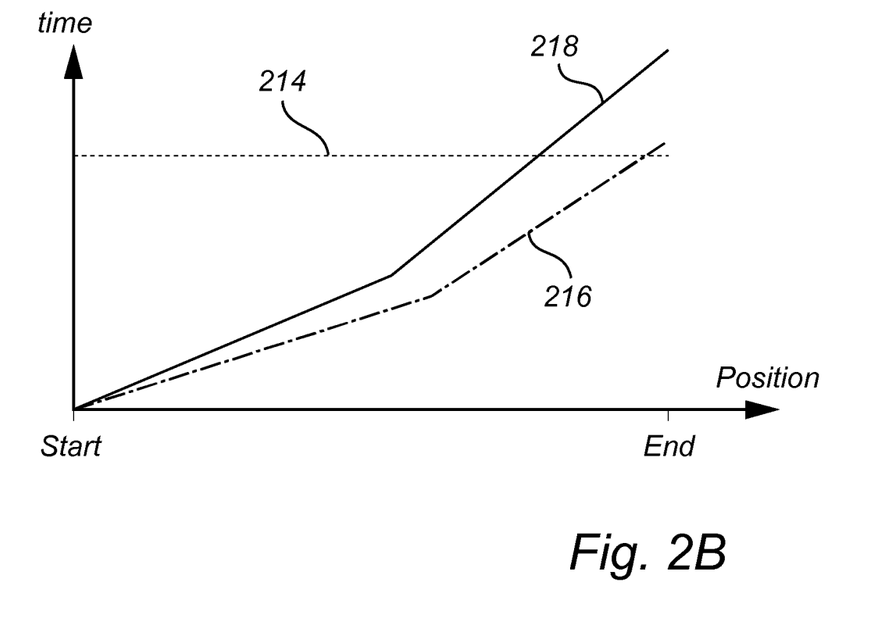

A result of that the relaxation coefficient is low (e.g. below 50 as exemplified in FIG. 2A) is that the driver of the vehicle 104, 106, 108 may be allowed to operate his vehicle in a manner that e.g. reduces the fuel consumption. As an example, in case the relaxation coefficient is low the driver may for example be allowed to actively reduce speed when driving uphill, as compared to a case where the speed profile 202 is to be strictly followed. A further example in this regard is presented in FIG. 2B. Specifically, FIG. 2B illustrates an exemplary correlation between a delay of arriving at the end of the route and the energy consumption for operating the vehicle from the start to the end of the route. As is seen, a large delay may in some situations allow for a lower energy consumption as compared to the case where vehicle 104, 106, 108 is arriving just in time (or just after=small delay) at the end of the route.

In FIG. 2B the line 214 is representative of the arrival time requested by the transport buyer 110, 112. Correspondingly, the lines 216, 218 represents the energy consumption in relation to different strategies for when to arrive at the end of the route, where line 216 represents an in comparison short delay (in time) and the line 218 represents an in comparison larger delay. As is apparent, less energy has been consumed in the case where the route has taken in comparison a longer time to travel.

Figure 3:
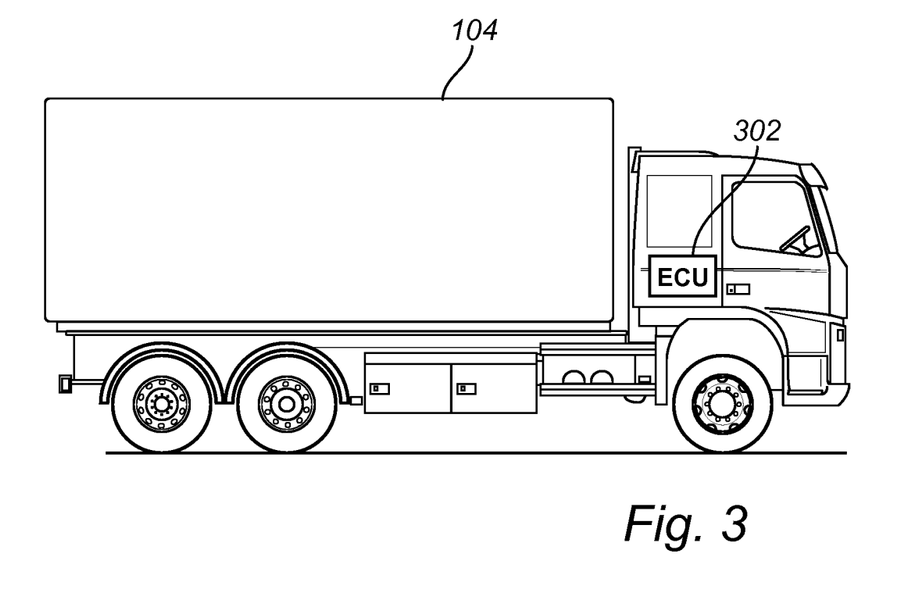
FIGS. 3A and 3B presents illustrative diagrams of the speed profile and related energy consumption following the concept according to the present disclosure.

The description above has been presented in relation to a client-server environment, where the server 102 has performed the determination of the speed profile 202 as well as the relaxation coefficient 214. With further reference to FIG. 3, it should be understood that the concept according to the present disclosure could be implemented "on-board" the vehicle 104, 106, 108.

Specifically, the exemplified vehicle 104 may comprise an electronic control unit (ECU) 302 being a component in an arrangement adapted for performing the method according to the present disclosure. The ECU 302 may for example be manifested as a general-purpose processor, an application specific processor, a circuit containing processing components, a group of distributed processing components, a group of distributed computers configured for processing, a field programmable gate array (FPGA), etc.

The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It should be understood that the ECU 302 may be included with a new vehicle, or retrofitted at a later stage.

Figure 4:
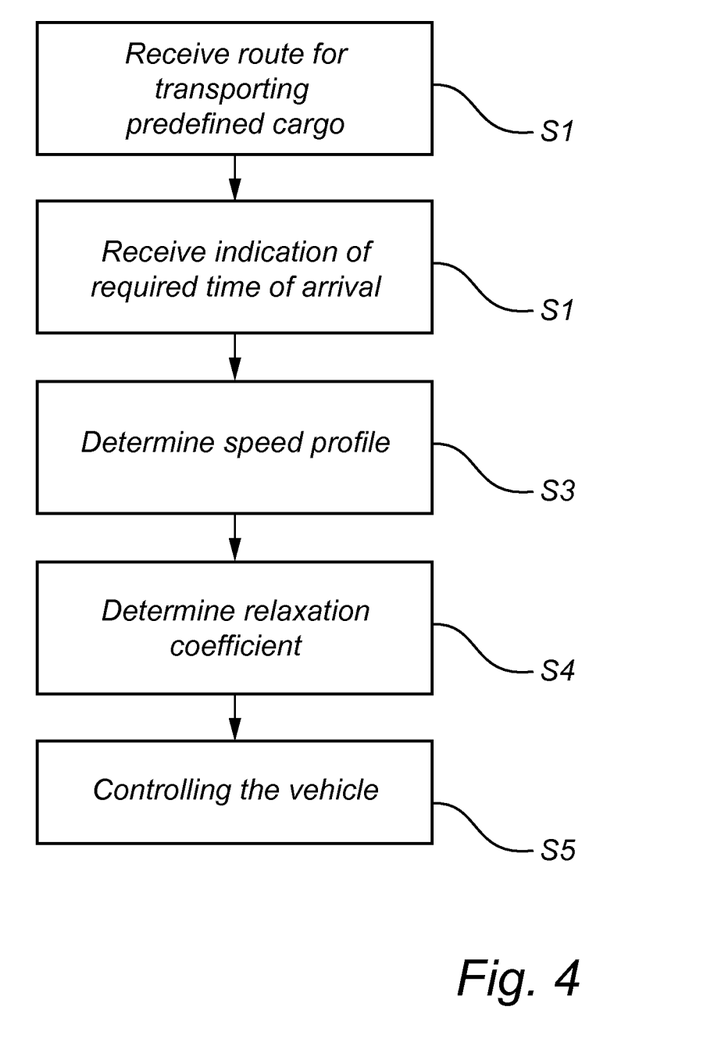
FIG. 4 shows a flow chart of a method according to an embodiment of the present disclosure.

In summary, with further reference to FIG. 4, the present disclosure relates to a computer implemented method for operating a vehicle 104, 106, 108, comprising the steps of receiving, S1, an indication of a route for transporting a predefined cargo, the indication of the route comprising a start and a destination, receiving, S2, an indication of a required time of arrival at the destination, determining, S3, a speed profile 202 for travelling the route, determining, S4, a relaxation coefficient 212 for the speed profile 202, wherein the relaxation coefficient 212 is dependent on a combination of a delay risk for the route and a penalty for arrival at the destination after the required time of arrival, and controlling, S5, the vehicle 104, 106, 108 based on a combination of the speed profile 202 and the relaxation coefficient 212.

Advantages following the present disclosure for example include the possibility to allow different missions for transporting cargo to have relaxation coefficients and thus to control the vehicles performing the transporting missions differently. This will accordingly result in different "costs" for the different transport missions. Generally, the stricter the speed profile must be followed the higher the cost for operating the vehicle.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for operating a vehicle, the method comprising:
   receiving an indication of a route for transporting a predefined cargo, the indication of the route comprising a start and a destination, the route comprising a plurality of segments,
   receiving an indication of a required time of arrival at the destination,
   determining a speed profile for travelling the route,
   determining a relaxation coefficient for the speed profile, and
   controlling the vehicle based on a combination of the speed profile and the relaxation coefficient,
   wherein:
      the relaxation coefficient is dependent on a combination of a delay risk for the route and a quantified penalty factor for deviation from a required time of arrival range at the destination,
      the delay risk for the route is derived from predictive analysis of transport conditions using a machine learning scheme trained on simulated or historical data for the route,
      the speed profile is adapted for the plurality of segments of the route to be travelled, and
      application of the relaxation coefficient dynamically adjusts the vehicle's adherence to the speed profile for ensuring optimal balance between punctuality, operational cost, and environmental considerations.

2. The method of claim 1, wherein the route comprises a predetermined time range for arriving at the start of the route.

3. The method of claim 1, wherein the speed profile is determined based on at least one of a desired maximum speed for the vehicle or a maximum legal speed for the vehicle at a section of the route.

4. The method of claim 1, wherein the method is performed by an electronic control unit on-board the vehicle.

5. The method of claim 1, wherein the method is performed by a cloud server, the cloud server being network connected to an electronic control unit of the vehicle.

6. The method of claim 1, wherein the speed profile is least partly optimized for reduced transport energy consumption.

7. A system for controlling a vehicle, the system comprising computing circuitry, wherein the computing circuitry is configured to:
   receive an indication of a route for transporting a predefined cargo, the indication of the route comprising a start and a destination, the route comprising a plurality of segments,
   receive an indication of a required time of arrival at the destination,
   determine a speed profile for travelling the route,
   determine a relaxation coefficient for the speed profile, and
   control the vehicle based on a combination of the speed profile and the relaxation coefficient,
   wherein:
      the relaxation coefficient is dependent on a combination of a delay risk for the route and a quantified penalty factor for deviation from a required time of arrival range at the destination,
      the delay risk for the route is derived from predictive analysis of transport conditions using a machine learning scheme trained on simulated or historical data for the route,
      the speed profile is adapted for the plurality of segments of the route to be travelled, and
      application of the relaxation coefficient dynamically adjusts the vehicle's adherence to the speed profile for ensuring optimal balance between punctuality, operational cost, and environmental considerations.

8. The system of claim 7, wherein the computing circuitry is implemented as an electronic control unit of the vehicle.

9. The system of claim 7, wherein the computing circuitry is implemented using a combination of an electronic control unit of the vehicle and a server arranged remotely from the vehicle.

10. The system of claim 7, wherein the route comprises a predetermined time range for arriving at the start of the route.

11. The system of claim 7, wherein the speed profile is determined based on at least one of a desired maximum speed for the vehicle or a maximum legal speed for the vehicle at a section of the route.

* * * * *